Figure 1:
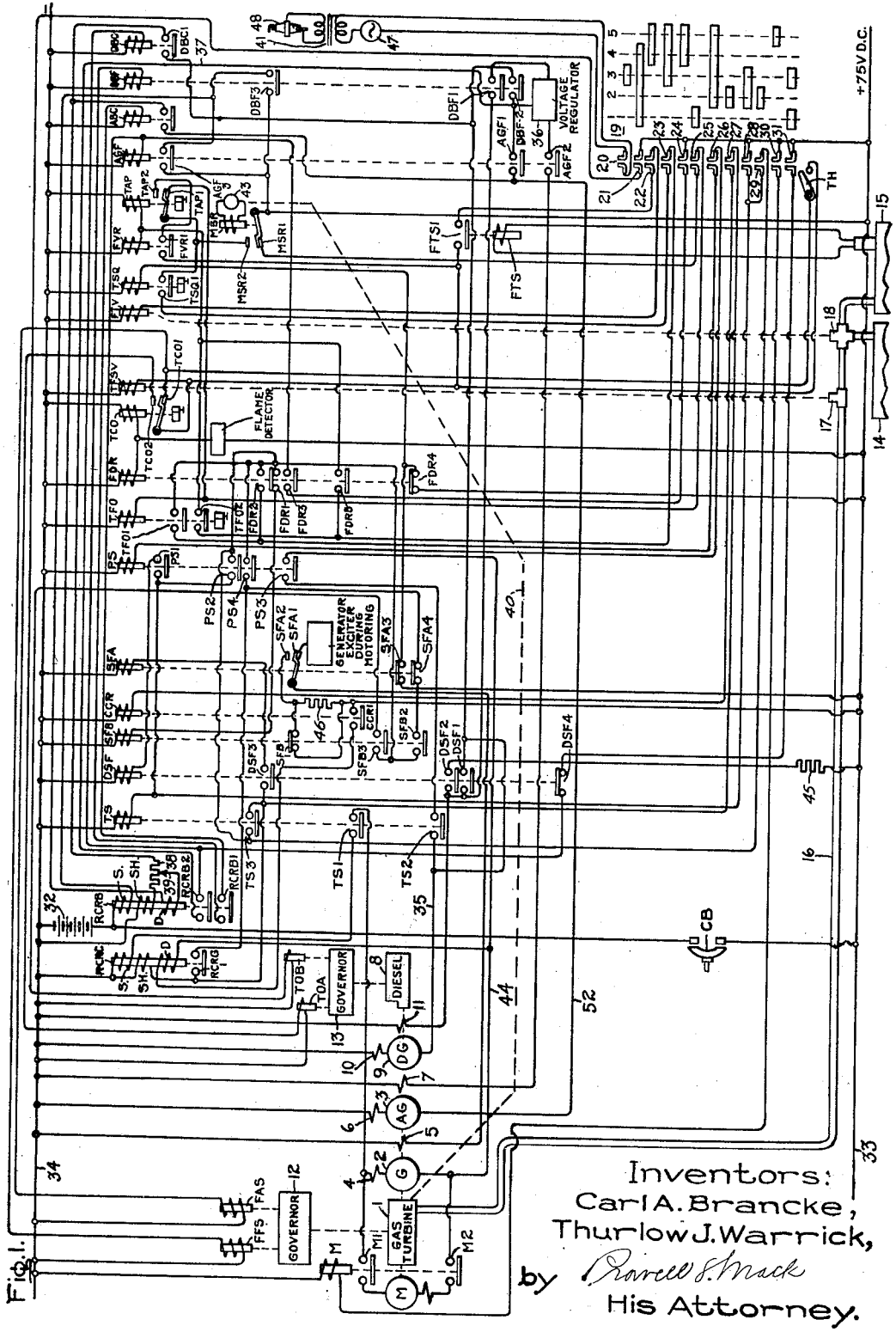

Nov. 3, 1953

C. A. BRANCKE ET AL 2,658,154

PRIME MOVER STARTING SYSTEM

Filed July 18, 1952

4 Sheets-Sheet 1

Inventors:
Carl A. Brancke,
Thurlow J. Warrick,
by *Harvell S. Mack*
   His Attorney.

Nov. 3, 1953 — C. A. BRANCKE ET AL — 2,658,154
PRIME MOVER STARTING SYSTEM
Filed July 18, 1952 — 4 Sheets-Sheet 2

Inventors:
Carl A. Brancke,
Thurlow J. Warrick,
by Powell P. Mack
His Attorney.

Nov. 3, 1953     C. A. BRANCKE ET AL     2,658,154
PRIME MOVER STARTING SYSTEM
Filed July 18, 1952

Inventors:
Carl A. Brancke,
Thurlow J. Warrick,
by *Browell S. Mack*
His Attorney.

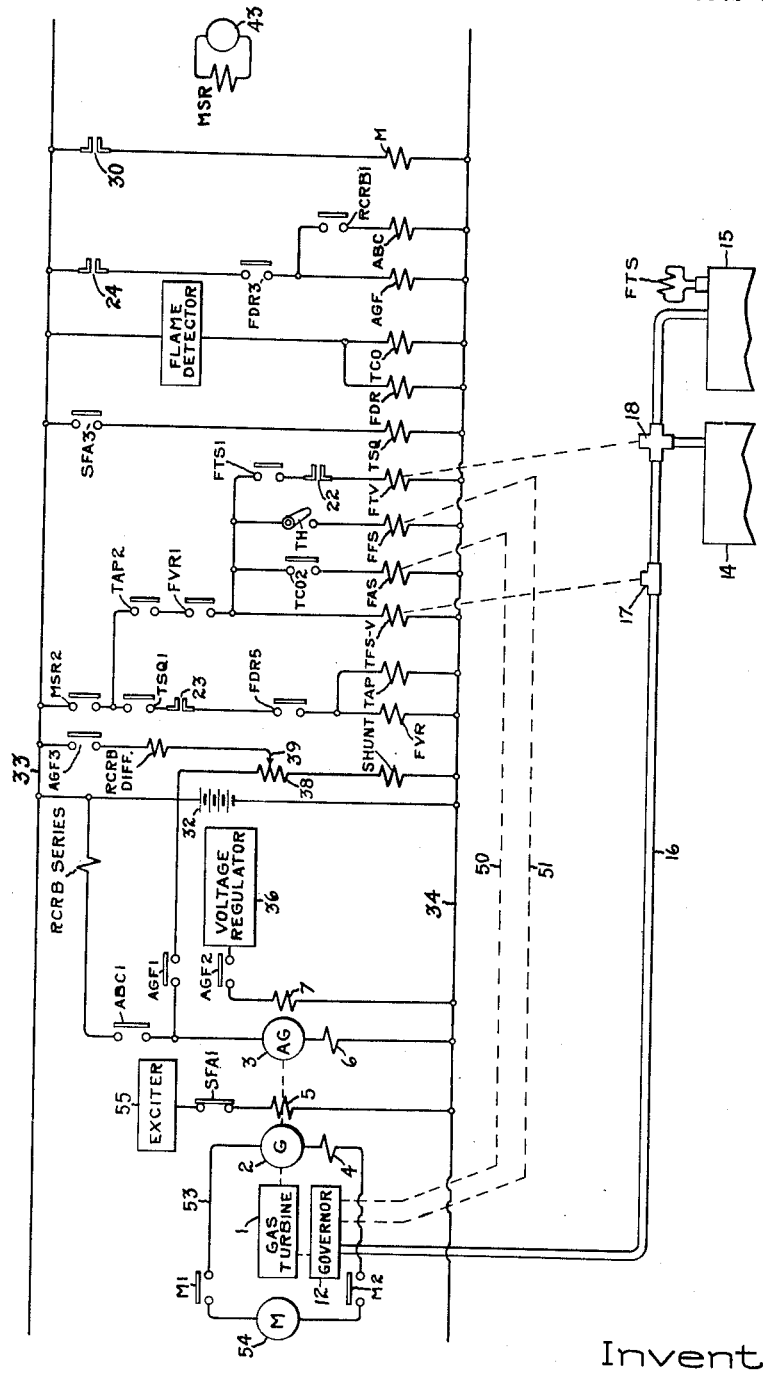

UNITED STATES PATENT OFFICE 2,658,154

PRIME MOVER STARTING SYSTEM

Carl A. Brancke, North East, and Thurlow J. Warrick, Erie, Pa., assignors to General Electric Company, a corporation of New York Application July 18, 1952, Serial No. 299,682

26 Claims. (Cl. 290—4)

This invention relates to a system for starting a thermal prime mover, for example, a gas turbine, and has particular application in connection with the utilization of such a prime mover in a self-propelled vehicle.

In conventional diesel-electric locomotives, the diesel prime mover is started by either injecting compressed air into the cylinders or cranking the diesel by means of a cranking motor energized by batteries in a manner similar to the starting of an automotive gasoline engine. A gas turbine, however, must be cranked to a much higher speed than a diesel in order to become self-sustaining, i. e., until the energy developed by the turbine is sufficient to operate the compressor. The cranking of the gas turbines utilized in central station applications presents no problem since there is adequate commercial power available to crank the turbine with a cranking motor. In the gas turbine-electric locomotive, however, space and weight limitations prohibit providing sufficient battery capacity for directly cranking the turbine and it is also not feasible to crank it with compressed air. It is therefore necessary in the design of gas turbine-electric locomotives to provide auxiliary means for cranking the gas turbine. Since the gas turbine in a gas turbine-electric locomotive drives one or more direct current traction generators, it has been found desirable to energize one of these traction generators as a shunt motor for cranking the turbine and this energization may be provided by an auxiliary thermal prime mover, such as a small diesel engine driving an auxiliary generator.

In order to start the gas turbine utilizing a separate auxiliary diesel-driven generator to energize one of the turbine-driven traction generators as a motor to crank the turbine, it has been found desirable to first crank the turbine to a first speed, then inject the fuel, and finally to disconnect the diesel-driven auxiliary generator from the traction generator when the turbine reaches idling speed. In order to provide continuous battery charging without the necessity for operating the auxiliary diesel after cranking is completed and the gas turbine is self-sustaining, a second auxiliary generator is provided mechanically driven by the gas turbine and it is therefore necessary to transfer battery charging from the diesel generator to the auxiliary generator and to shut down the diesel when the turbine has successfully reached idling speed. It has been further found desirable to initially inject a high grade of fuel, such as diesel fuel, into the turbine for starting and after the turbine has reached idling speed, to transfer to a lower grade fuel, such as Bunker C fuel oil. While the starting equipment for a central station gas turbine may be reasonably complicated, in the case of the gas turbine-electric locomotive, it is necessary to provide simplified supervisory control means for initiating the various steps in the starting and shutdown sequence. A system for starting a thermal prime mover, such as a gas turbine, providing the features enumerated above is described in copending application Serial No. 294,808, filed June 21, 1952, of Carl A. Brancke, assigned to the assignee of this application.

It has been found desirable to incorporate additional features, generally designed to protect the equipment in the event of some malfunctioning during the starting sequence. For example, in the event that the cranking speed does not reach a predetermined value within a predetermined time, it has been found desirable to disconnect the cranking connection, i. e., the connection of the diesel-driven auxiliary generator to the turbine-driven generator. Assuming that the auxiliary prime mover has cranked the main prime mover up to the first minimum speed prior to fuel injection and that the turbine has fired satisfactorily, it is then necessary to increase the cranking speed until the turbine becomes self-sustaining. In order to effect this increase in cranking speed, it is necessary to weaken the field on the turbine-driven generator and to speed up the diesel driving the auxiliary generator, and it is further necessary to increase the fuel rate to the turbine a predetermined time after firing. If the turbine fails to fire, however, it is desirable to shut off the fuel and to disconnect the cranking connection. Furthermore, if the turbine fails to reach its self-sustaining or idling speed within a reasonable length of time, it is again desirable to shut off the fuel and disconnect the cranking connection. In the event that the turbine has been shut down due to a failure to fire or a failure to reach its idling speed in the required time, it is desirable that a further attempt to start be delayed for a predetermined period of time to allow the unburned fuel which has been injected into the turbine to drain from the combustion chambers.

An object of this invention is therefore to provide an improved starting system for a thermal prime mover incorporating the above-enumerated features.

Further objects and advantages of this invention will become apparent and the invention will be better understood by reference to the following description and the accompanying drawing and the features of novelty which characterize this invention will be pointed out with particularity in the claims annexed to and forming a part of this specification.

In accordance with this invention, there is provided a thermal prime mover, such as a gas turbine, mechanically connected to drive a main generator, such as one of the traction generators of a gas turbine-electric locomotive, and an auxiliary generator. An auxiliary thermal prime mover, such as a diesel, is also provided mechanically connected to drive another auxiliary generator. In order to start the main prime mover, the auxiliary prime mover is first started in any convenient manner, as, for example, by a cranking motor energized from the locomotive batteries. Circuit establishing means are provided arranged when actuated to connect the auxiliary prime mover-driven generator to the main generator in order to operate it as a motor to crank the turbine. When this circuit establishing means is not actuated, it connects the auxiliary prime mover-driven generator to the locomotive batteries for charging. Two sources of fuel are provided, such as diesel fuel and Bunker C fuel, with valves respectively arranged to inject the two types of fuel into the prime mover. Supervisory control means, such as a drum controller, is provided arranged sequentially to actuate the circuit establishing means to connect the auxiliary prime mover-driven generator to the main generator for cranking and to actuate the fuel valves to admit the two types of fuel to the turbine in the proper sequence.

In order to stop cranking if a predetermined turbine speed has not been reached in a predetermined time, for example, ten percent (10%) speed in 45 seconds, time delay means are provided arranged to de-actuate the circuit establishing means after the desired time delay and means responsive to the turbine speed are provided arranged to render ineffective the time delay means responsive to the desired cranking speed. Means are also provided to weaken the field on the main generator and to speed up the diesel responsive to firing of the turbine. In addition, means are provided to increase the rate of fuel injection to the turbine a predetermined time after firing. In order to shut off the fuel flow to the turbine and disconnect the cranking connection in the event that the turbine fails to fire in a predetermined time, for example, 45 seconds, the time delay means is arranged to again become effective when the minimum cranking speed is reached and to shut off the fuel to the turbine and to disconnect the cranking connection after the predetermined time delay. A flame-detecting device is arranged to render the time delay means ineffective responsive to firing of the turbine. In order to shut down the turbine and disconnect the cranking connection in the event that the turbine fails to reach idling speed in a predetermined time, for example, 10 minutes, a second time delay means is provided arranged to shut off the fuel to the turbine and to disconnect the cranking connection after the predetermined time delay. Means responsive to the idling speed of the turbine, for example, a reverse current relay, is connected to render ineffective the second time delay means responsive to a turbine reaching idling speed. Time delay means are also provided to prevent initiation of the starting sequence for a predetermined period, for example, 4 minutes, in the event that the turbine has been shut down due to failure to fire or to failure to reach idling speed in the requisite time.

In the drawing, Fig. 1 schematically illustrates the improved thermal prime mover starting system of this invention; and Figs. 2 to 6 inclusive are schematic illustrations respectively showing the circuits set up by the various components of the system in each of the five controller positions.

Referring now to Fig. 1, there is shown a main thermal prime mover, such as a locomotive gas turbine 1 mechanicaly connected to drive at least one main traction generator 2 and an auxiliary generator 3. The main generator 2 is provided with a commutating field exciting winding 4 and a shunt field exciting winding 5. The auxiliary generator 3 has a commutating field exciting winding 6 and a shunt field exciting winding 7. An auxiliary thermal prime mover, such as a diesel 8, is provided mechanically connected to drive another auxiliary generator 9, also provided with a commutating field exciting winding 10 and a shunt field exciting winding 11. The gas turbine 1 and the diesel 8 are respectively provided with governors 12 and 13. Two sources of fuel are provided for the gas turbine 1, source 14 furnishing a first type of fuel, for example, diesel fuel oil, and source 15 furnishing a second type, for example, Bunker C fuel. The fuel is furnished to the gas turbine 1 through fuel supply line 16 with solenoid-actuated valve 17 controlling the admission of fuel to the turbine and solenoid-actuated transfer valve 18 selecting either source 14 or source 15 for connection to the supply line 16. In order to sequentially actuate the various circuit establishing devices to be hereinafter described, a 5-position controller 19 is provided having a plurality of cam-actuated contacts 20 to 31 inclusive. It will be readily understood that the controller 19 may be either manually operated or pilot motor-driven. The control power for the system is provided by battery 32 connected respectively to positive control line 33 and negative control line 34 with circuit breaker CB interposed in series therewith.

The connection and functioning of the remaining components of the system can best be described in connection with the description of the operation of the system and with reference to Figs. 2 to 6 inclusive.

Figure 2:
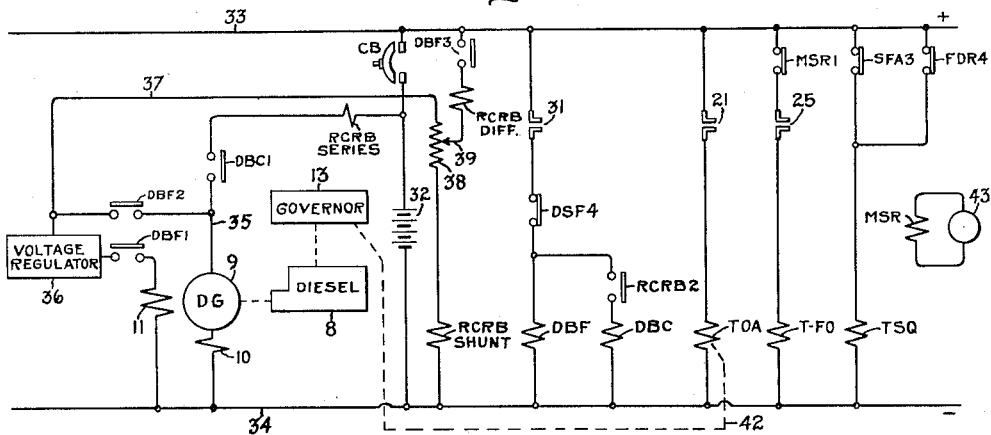

Referring now to Fig. 2, there is shown schematically the circuits established with the controller 19 in the first position. In Fig. 2 and the following figures, only those components of the system are shown which are effective in the particular position of controller 19. In the first controller position, the turbine 1 is shut down and the diesel 8 is already started and running, the diesel having been started in any suitable manner, as by a battery-energized starting motor. It will be seen that one side of the diesel generator 9 is connected to the negative control line 34 with the commutating field exciting winding 10 being interposed in series therewith, and that the negative side of the battery 32 and one side of the diesel shunt field winding 11, a shunt coil of reverse current relay RCRB, and the coils of relays DBF, DBC, TOA, TFO and TSQ are each connected to the negative control line 34. The other side of the diesel generator 9 is connected to the positive side of the battery 32 by means of line 35 with contact DBC-1 of relay DBC and the series coil of reverse current relay RCRB arranged in series therewith. Contact DBF-1 of relay DBF connects the other side of diesel generator shunt field exciting winding 11 to the output of voltage regulator 36 while contact DBF-2 of relay DBF connects the input of the voltage regulator 36 to line 35 which in turn is connected to the diesel generator 9. The positive side of the diesel generator is also connected to the other side of the shunt coil of reverse current relay RCRB by means of line 37 with potentiometer 38 being arranged in series therewith. The tap 39 of potentiometer 38 is connected to one side of the differential coil of reverse current relay RCRB with the other side thereof being connected to positive control line 33 by means of contact DBF-3 of relay DBF. The operating coil of relay DBF is connected to the positive control line 33 by means of contact 31 of controller 19 and normally closed contact DSF-4 of relay DSF, this relay not being energized in the first controller position as will be hereinafter described. Contact RCRB-2 of reverse current relay RCRB connects the operating coil of relay DBC across the operating coil of relay DBF. The operating coil of diesel operating relay TOA is connected to the positive control line 33 through contact 21 of controller 19. Operator TOA is connected to governor 13 of diesel 8 to preselect a first fuel rate by means of the connection shown by the dotted line 42. The operating coil of time delay relay TFO is connected to the positive control line 33 through normally closed contact MSR-1 of minimum speed relay MSR and contact 25 of controller 19. The time delay relay TFO is provided with a predetermined delay on dropout, for example, 45 seconds, for a reason to be hereinafter described. Another time delay relay TSQ has its operating coil connected to the positive supply line 33 through normally closed contact SFA-3 of relay SFA, with normally closed contact FDR-4 of flame detector relay FDR being connected thereacross. Relays SFA and FDR are not energized in the first controller position, as will be hereinafter described. The operating coil of minimum speed relay MSR is energized by a suitable tachometer generator 43 driven by the gas turbine 1 as shown by the dotted line 40 of Figs. 1 and 3.

The functioning of the system in the first controller position will now be described. Referring still to Fig. 2, but with reference to the cam development of controller 19 shown in Fig. 1, it will be seen that contacts 21, 25 and 31 are closed in the first controller position. Since the minimum speed relay MSR is set to pick up at a predetermined turbine speed, for example, 10% of full speed, contact MSR-1 will be closed and since contact 25 of controller 19 is closed in the first position, time delay relay TFO will be picked up. As pointed out above, relay SFA is not picked up in the first position and therefore contact SFA 3 will be closed picking up time delay relay TSQ. This time delay relay is provided with another time delay on dropout, for example, 10 minutes, for a purpose to be hereinafter described, in connection with one of the other controller positions. Since no fuel has been introduced to the turbine and ignition has not taken place, contact FDR-4 of the flame detector relay will also be closed. Since relay DSF is not energized in the first controller position, contact DSF-4 will be closed, and since contact 31 of controller 19 is closed, relay DBF will pick up closing contacts DBF-1, DBF-2, and DBF-3. Closing of contact DBF-3 energizes the shunt coil of reverse current relay RCRB, and if the differential is energized with the proper polarity the relay will pick up closing contact RCRB-2 to pick up relay DBC closing contact DBC-1. Closing of contact 21 by the controller 19 energizes the operating coil of operator TOA of governor 13 presetting the governor to idle speed setting.

It will now be seen that with contact DBC-1 closed, the armature of diesel generator 9 is connected across the battery 32 for charging with shunt field exciting winding 11 connected for excitation under control of voltage regulator 36. Thus, in the first controller position, the diesel 8 is running connected to charge the battery 32. It will be noted that the time delay relays TFO and TSQ are not actually utilized in the first controller position. However, it is necessary that they be picked up in this position so that they can be timed out in future controller positions.

Figure 3:
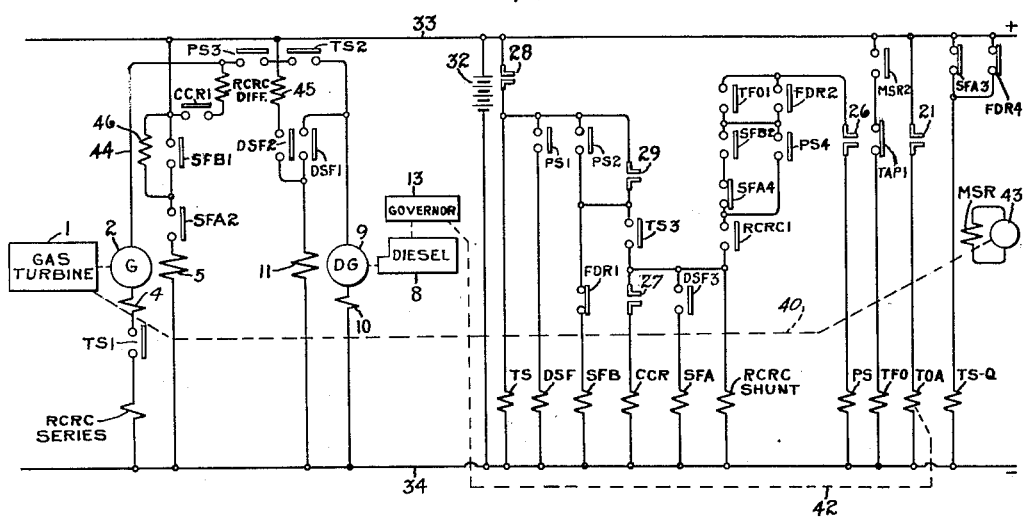

Referring now to Fig. 3, there is shown schematically the circuits established and components effective in the second position of controller 19. Referring momentarily again to Fig. 1 and the cam development shown for controller 19, it will be seen that contact 31, closed in the first position of the controller, is now open, therefore dropping out relays DBF and DBC. Reference to Fig. 2 will clearly show that dropping out of relay DBC opens contact DBC-1 disconnecting the diesel generator armature 9 from battery 32 and the dropping out of relay DBF opens contacts DBF-1 and -2 disconnecting diesel generator shunt field 11 from the voltage regulator 36. It will also be seen that contact 25, closed in the first position, thus energizing time delay relay TFO, is now open in the second position causing relay TFO to start timing out. This time delay on dropout may be for a suitable predetermined time, for example, 45 seconds. Contact 29 of the controller 19 is closed in the second controller position, thus energizing relay TS closing contacts TS-1 and TS-2. It will be noted that the armature of generator 2 is connected to negative line 34 through its commutating field exciting winding 4, contact TS-1 and the series coil of reverse current relay RCRC. As noted hereinbefore, the armature of diesel generator 9 is also connected to the negative line 34 through its commutating field exciting winding 10. The other sides of the armatures of main generator 2 and diesel generator 9 are connected together by a bus 44 having contacts PS-3 of power switch PS and TS-2 of relay TS interposed in series therewith. Picking up of relay TS also closes normally open contact TS-3 and since contact 29 of controller 19 is closed, the shunt coil of reverse current relay RCRC will be energized. Since contact 29 is closed, relay SFB picks up through normally closed flame detector relay contact FDR-1, thus closing contacts SFB-1 and SFB-2. Since contact 27 is closed in the second position, relay CCR will be energized closing its contact CCR-1 to energize the differential coil of reverse current relay RCRC thus picking up the relay to close contact RCRC-1.

It will now be seen that with contacts 28 and 29 closed, contact TS-3 closed by reason of relay TS being picked up, contact RCRC-1 closed by reason of RCRC shunt coil being energized, contact SFA-4 closed since relay SFA is not yet picked up, contact SFB-2 closed since relay SFB is picked up, and contact 26 of controller 19 closed, the only remaining contact which must be closed to energize the operating coil of power switch PS is either contact TFO-1 of time delay relay TFO or contact FDR-2 of the flame detector relay FDR. Since in the second controller position fuel is not injected in the turbine, no ignition will have taken place and contact FDR-2 must be opened. However, it will be recalled that time delay relay TFO having a 45-second dropout was picked up in the first controller position and has been de-energized in the second controller position by reason of the opening of contacts 25 of the controller 19. Therefore, time delay relay TFO is timing out. However, its contact TFO-1 will still be closed, thus completing the circuit to the operating coil of power switch PS picking up the power switch. Contact PS-3 will then be closed completing the connection between the armature of the diesel generator 9 and the armature of the turbine generator 2. Picking up of power switch PS closes its contact PS-1, thus energizing relay DSF, closing its contacts DSF-1 and DSF-2, connecting the shunt field exciting winding 11 of diesel generator 9 for self separate excitation, i. e., contact DSF-1 connects the field winding 11 across the armature of the diesel generator 9 and contact DSF-2 connects the field winding 11 across the battery 32 through resistance 46. Picking up of power switch PS closes its normally open contact PS-2, thus sealing in relay SFB and contact PS-4 is now closed sealing in the operating coil of the power switch PS across contacts SFB-2 and SFA-4. Picking up of the relay DSF closed its normally open contacts DSF-3, thus energizing relay SFA, closing its normally open contact SFA-2 to energize the shunt field exciting winding 5 of the turbine generator 2 from the battery 32. Since relay SFB is picked up, its contact SFB-1 is closed shunting out the resistance 46 to connect the shunt field winding 5 directly across the control lines 33 and 34. Picking up of relay SFA also opens its normally closed contact SFA-4; however, as pointed out hereinbefore, normally open contact PS-4 of the power switch PS is now closed.

Closing of the contact SFA-2 placing battery field on the turbine generator 2 causes the diesel generator 9 to operate the turbine generator 2 as a shunt excited motor to crank the gas turbine 1. It will be noted that contact 21 of controller 19 is still closed in the second controller position, energizing the diesel governor operator TOA to preset the governor 13 of diesel 8 for a first preselected fuel rate. It should now be recalled that contact TFO-1 of time delay relay TFO is still closed. However, the time delay relay TFO is timing out since contact 25 of controller 19 is open in the second position. Thus, if the 45-second time delay dropout of time delay relay TFO elapses and the relay is not sealed in, contact TFO-1 will open dropping out the power switch PS. It will be seen, however, that normally open contact MSR-2 of the minimum speed relay MSR and normally closed contact TAP-1 of relay TAP are now interposed in series with the operating coil of time delay relay TFO. Relay TAP is not picked up in the second controller position, so its contact TAP-1 will remain closed and minimum speed relay MSR, as pointed out hereinbefore, is energized from a tachometer generator 43 and set to pick up at a predetermined turbine speed, for example, 10%. Therefore, it will be seen that if the diesel generator 9 is able to crank the turbine 1 up to 10% speed within the 45-second dropout period of time delay relay TFO, minimum speed relay MSR will operate to close its contact MSR-2, thus sealing in time delay relay TFO so that its contact TFO-1 remains closed and the power switch PS remains picked up. If the 10% turbine speed is not reached in the 45-second dropout time, time delay relay TFO will time out opening its contact TFO-1 and deenergizing the operating coil of power switch PS. This will open contact PS-3 in the line 44 disconnecting the armature of diesel generator 9 from the armature of turbine generator 2 to stop cranking.

Thus, it is seen that the diesel generator will only crank for a maximum of 45 seconds, and in the event that the turbine does not reach 10% speed in that time, the cranking circuit is opened to prevent damage to turbine generator 2 from high current. Thus, cranking to 10% of full speed is accomplished in the second position of controller 19. It will be noted that time delay relay TSQ which has a 10-minute dropout is energized in the second controller position. Contact SFA-3 of relay SFA will be opened since SFA will be picked up. However, since no ignition has occurred in the second controller position, normally closed contact FDR-4 of the flame detector relay will be closed, thus energizing the time delay relay TSQ. This relay is not actually used in the second controller position. However, it must be picked up so that it can be dropped out in a subsequent position to utilize its 10-minute dropout time.

Figure 4:
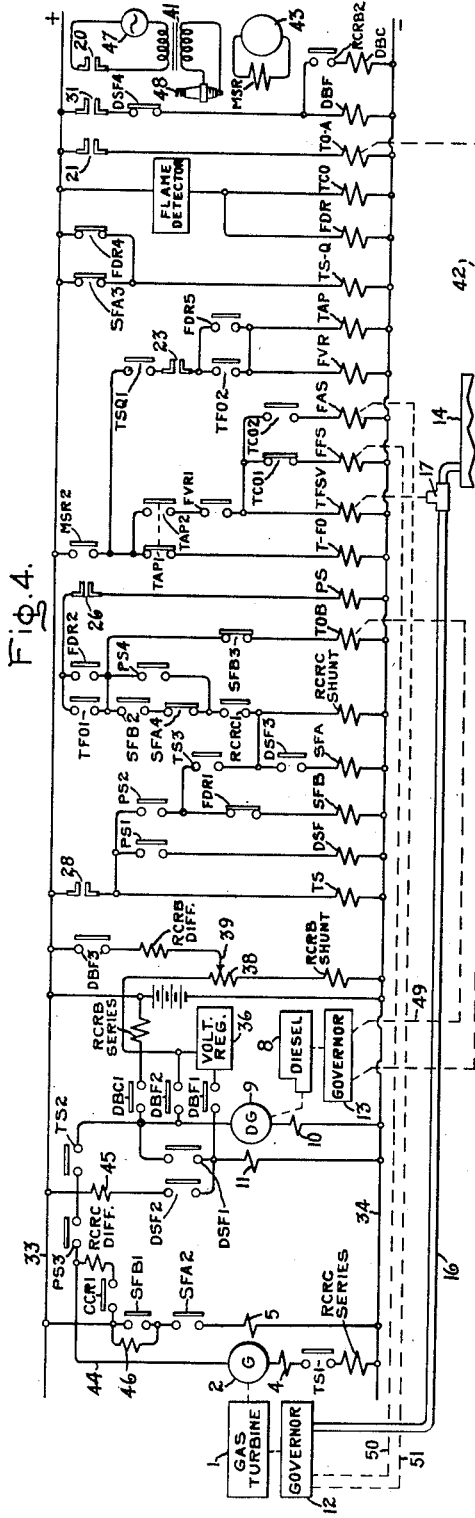

Referring now to Fig. 4, which schematically shows the circuits established and components effective in the third position of the controller 19, it will be recalled that in the second position the turbine had been cranked to 10% of full speed within the 45-second dropout time of the time delay relay TFO; therefore, causing minimum speed relay MSR to pick up sealing in time delay relay TFO. In the third position, contact 28 of controller 19 is still closed and the operating coil of power switch PS is still energized through its interlock PS-2, contact TS-3 of relay TS, contact RCRC-1 of reverse current relay RCRC, interlock PS-4 of power switch PS, contact TFO-1 of time delay relay TFO, and contact 26 of controller 19 which is also closed in the third position. With relay TS and power switch PS picked up, contacts PS-3 of the power switch and TS-1 and TS-2 of relay TS are picked up, thus the armature of diesel generator 9 is still connected to the armature of turbine generator 2 for cranking. Relay SFB is picked up through normally closed interlock of flame detector relay 1 and relay DSF is picked up through interlock PS-1 of power switch PS. Thus, relay SFA is picked up through contact DSF-3 of relay DSF and thus contacts SFA-2 of relay SFA and SFB-1 of relay SFB are both picked up connecting shunt field winding 5 of turbine generator 2 across lines 33 and 34 for excitation from the battery 32. With relay DSF picked up, its contacts DSF-1 and DSF-2 are picked up connecting the shunt field exciting winding 11 of diesel generator 9 for self separate excitation. It will be seen that time delay relay TSQ is picked up through normally closed flame detector relay contact FDR-4. Since the minimum speed relay is picked up by virtue of the turbine 1 being cranked to 10% speed, and since time delay relays TFO and TSQ are picked up, a circuit is established through contact MSR-2 of the minimum speed relay MSR, contact TSQ-1 of time delay relay TSQ, contact 23 of controller 19 closed in the third controller position, contact TFO-2 of time delay relay TFO, to energize fuel valve relay FVR and relay TAP. Picking up of relay TAP opens its contact TAP-1 to de-energize the time delay relay TFO to again initiate its 45-second time delay dropout and closes contact TAP-2. Since fuel valve relay FVR is picked up, its contact FVR-1 will be closed, thus energizing the operating coil TFSV of solenoid valve 17 to admit fuel to the turbine 1. Contact 21 of controller 19 is closed in the third position, thus energizing diesel governor operator TOA to preselect a first fuel rate. Contact 20 of controller 19 is also closed in the third position, thus connecting a source of alternating current 47, such as a 400 cycle generator to ignition transformer 41 to in turn energize spark plug 48 and initiate combustion in the turbine.

It will now be seen that time delay relay TFO is again timing out by virtue of the picking up of relay TAP and that in the event that it completes its 45-second dropout without being sealed in, its contact TFO-1 will open dropping out power switch PS to disconnect the cranking connection and its contact TFO-2 will open de-energizing fuel valve relay FVR to shut off the fuel valve 17. However, it is noted that the flame detector relay FDR and the relay TCO are both energized from the flame detector, the relay TCO having a 90-second time delay on pickup. If combustion takes place in the turbine, within the 45-second dropout time of time delay relay TFO, flame detector relay FDR will pick up closing its contact FDR-2 to seal in the power switch PS to retain the cranking connection. Contact FDR-5 will also be closed to seal in fuel valve relay FVR and relay TAP and contact FDR-4 will now open starting time delay relay TSQ on its 10-minute time delay dropout. Contact FDR-1 will also open de-energizing relay SFB, thus opening contact SFB-1. This places resistance 46 in series with shunt field 5 of turbine generator 2 to weaken the field strength to obtain better utilization of the diesel generator 9. Dropping out of relay SFB closes contact SFB-3 energizing diesel governor operator TOB which through its connection shown by the dashed line 49 to the diesel governor 13 changes the fuel setting of diesel 8 from idle to full speed. Contact SFB-2 will also, of course, open; however, diesel governor operator TOB and power switch PS are sealed in through power switch interlock PS-4 and the power switch PS is now sealed in through flame detector relay contact FDR-2. After 90 seconds, relay TCO will be energized from the flame detector opening its contact TCO-1 and closing its contact TCO-2. Contact TCO-1 when closed energized turbine governor operator FFS to preselect the first fuel rate and closing of contact TCO-2 energizes turbine governor operator FAS to preselect a second fuel turbine rate, operators FAS and FFS being connected to actuate turbine governor 12 as shown by dashed lines 50 and 51 respectively.

If combustion fails to take place in the 45-second dropout period of time delay relay TFO, FDR does not pick up sealing in fuel valve relay FVR and relay TAP and time delay relay TFO times out de-energizing FVR and TAP shutting off the fuel flow and also de-energizing power switch PS to disconnect the diesel generator 9 from the turbine generator 2 to stop cranking. Relay TAP has a 4-minute dropout which prevents reopening fuel valve TFSV, thus allowing unburned fuel to drain from the combustion chambers of the turbine. The generator 2 as a shunt motor is now accelerating the turbine to idling speed, it being recalled that time delay relay TSQ is now timing out since contact FDR-4 of flame detector relay FDR is opened and thus the acceleration to self-sustaining or idling speed of the turbine 1 must be accomplished in 10 minutes.

When the turbine 1 reaches self-sustaining or idling speed, reverse current flows in the series coil of reverse current relay RCRC, thereby de-energizing the relay opening contact RCRC-1 to drop out power switch PS. This disconnects the diesel generator 9 from the turbine generator 2 to stop cranking which in turn opens power switch interlocks PS-1, PS-2 and PS-4 dropping out relays DSF, SFA and the diesel governor operator TOB. Since relay SFA is dropped out, its contact SFA-3 will close, thus sealing in relay TSQ to stop the 10-minute time delay dropout. If, however, idling speed, as indicated by reverse current flowing in the series coil of the reverse current relay RCRC is not reached in 10 minutes, time delay relay TSQ will time out opening its contacts TSQ-1, dropping out fuel valve relay FVR and relay TAP. Dropping out of fuel valve relay FVR in turn drops out fuel valve TFSV to shut off fuel from the turbine 1. Shutting off fuel will extinguish combustion, thus causing flame detector relay FDR to drop out opening contact FDR-2 to drop out power switch PS, thus disconnecting the cranking connection between diesel generator 9 and turbine generator 2. Relay TAP being de-energized would again initiate its 4-minute dropout time to prevent another attempt at starting prior to the expiration of that time delay period. Dropping out of power switch PS opens its interlock PS-2, thus de-energizing diesel governor operator TOB.

If the power switch PS has been dropped out by reason of the operation of the reverse current relay RCRC responsive to the turbine 1 reaching idling speed, its interlock PS-2 will open dropping out diesel governor operator TOB to return the diesel 8 to idling speed. With power switch PS opened, relay DSF is dropped out disconnecting the diesel shunt field winding 11 from its self separate excitation connection. Since contact 31 of controller 19 is again closed in the third position, and with contact DSF-4 of relay DSF closed, relay DBF will now pick up again connecting the shunt field 11 of diesel generator 9 for excitation from the voltage regulator 36. Picking up of DBF closes its contact DBF-2 to again energize the shunt coil of reverse current relay RCRB, and if the differential coil is energized with the proper polarity, the relay picks up closing its contact RCRB-2 to energize relay DBC. Contact DBC-1 of relay DBC is now closed connecting the diesel generator 9 across the battery 32 for charging.

It will now be seen that in the third switch position, the turbine comes up to idling or self-sustaining speed which is approximately 70% of the full speed with the diesel running and the diesel generator 9 charging the battery 32. In the event that combustion had failed to take place, the cranking connection would have been broken and this connection could not have been re-established for 4 minutes by virtue of the time delay dropout of relay TAP. Further, in the event that the combustion did take place, but idling or self-sustaining speed was not reached within 10 minutes, the cranking connection would again be broken and the fuel shut off and a further attempt to again start the turbine would have been prevented for a 4-minute dropout period of relay TAP.

Figure 5:
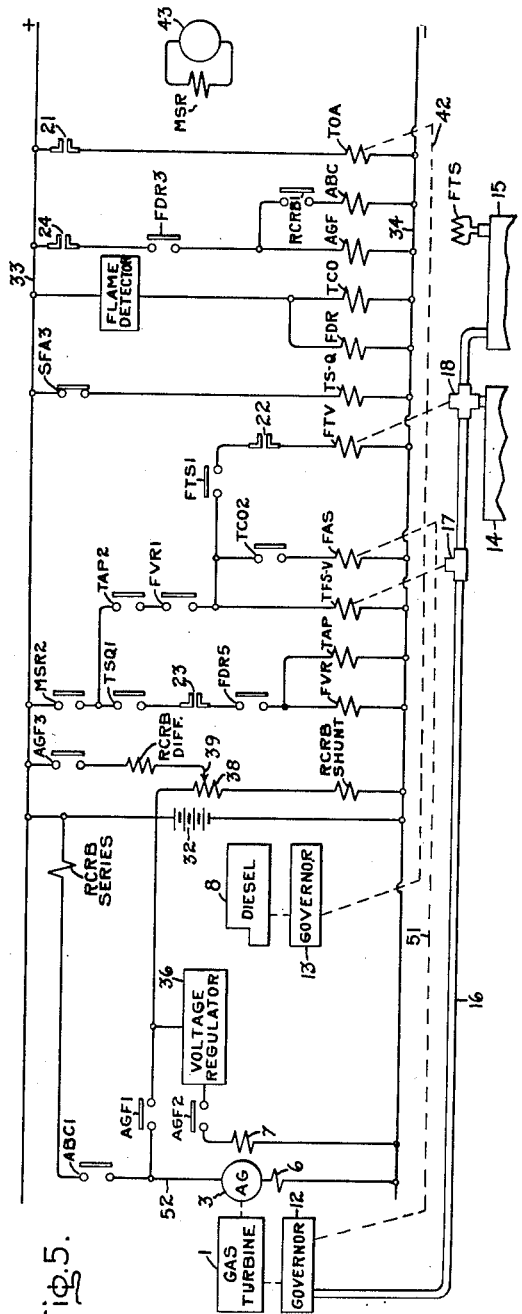

Referring now to Fig. 5, which schematically illustrates the circuits established and the elements effective in the fourth position of controller 19, it will be recalled that in the third position the gas turbine 1 was brought up to self-sustaining speed, the cranking connection broken, and the diesel generator 9 connected for battery charging. In the fourth position, it will be noted that contact 31 of controller 19 is opened, thus dropping out relays DBF and DBC, disconnecting the diesel generator 9 from its charging connection with battery 32. Contact 24 is closed, however, and since combustion is taking place, flame detector relay contact FDR-3 will be closed, energizing relay AGF. This closes contacts AGF-1 and AGF-2 connecting shunt field exciting winding 7 of turbine-driven auxiliary generator 3 to the voltage regulator 36 and contact AGF-3 is closed, energizing the shunt coil of reverse current relay RCRB. If the differential coil is energized with the proper polarity, contact RCRB-1 is thus closed, energizing relay ABC, closing contact ABC-1 to place the armature of turbine-driven auxiliary generator 3 across the battery 32 for charging by means of line 52 having series coil of reverse current relay RCRB in series therewith. Thus, battery charging is transferred from the diesel generator 9 to the turbine-driven auxiliary generator 3. It will be noted that contact 21 of controller 19 is closed in the fourth position, thus energizing diesel governor operator TOA so that the diesel 8 continues to idle at no load. It will be recalled that the opening of the power switch PS also dropped out relay SFA in the third position, and thus in the fourth position, contact SFA-3 of relay SFA is closed, thus keeping time delay relay TSQ picked up. Since the speed of the turbine is well above the 10% pickup of minimum speed relay MSR, contact MSR-2 is closed and contact TSQ-1 is also closed by virtue of relay TSQ being picked up. Contact 23 of controller 19 is closed in the fourth position and since combustion is taking place, flame detector relay contact FDR-5 will be closed, thus energizing fuel valve relay FVR and time delay relay TAP. Contact TAP-2 is thus closed along with contact FVR-1 of fuel valve relay FVR, thus energizing operating coil TFSV of valve 17 to open fuel line 16 to the turbine 1 and since relay TCO has picked up after its 90-second time delay by virtue of combustion detected by the flame detector, contact TCO-2 will be closed, energized turbine governor operator FAS to preselect the higher fuel rate needed to accelerate to self-sustaining speed. At this point, it will be noted that operating coil FTV of fuel transfer valve 18 is energized through contacts 22 of controller 19 which are closed in the fourth position and normally open contact FTS1 of fuel temperature sensing relay FTS. Assuming the temperature of the Bunker C fuel oil in the tank 15 has not reached the proper level, the turbine 1 will thus be operating on diesel fuel from the tank 14. However, if the temperature of the Bunker C fuel is at a predetermined minimum level, fuel temperature sensing relay FTS will pick up closing contact FTS-1 to energize operating coil FTV of fuel transfer valve 18. This will transfer fuel connections from tank 14 to tank 15, thus transferring from diesel-type fuel to Bunker C fuel.

Thus, in the fourth position, the turbine-driven auxiliary generator 3 is connected for battery charging and the fuel supply for the turbine 1 is transferred from diesel type to Bunker C type, the diesel 8 still operating in idling at no load.

Referring now to Fig. 6, which schematically illustrates the circuit connections in the fifth position of controller 19, we find that contact 21, which was closed in the fourth position, is now open de-energizing diesel governor operator TOA, thereby shutting down the diesel. Gas turbine 1 is now idling on Bunker C fuel with the diesel shut down with the auxiliary generator 3 charging battery 32, contact 24 of controller 19 being closed and relays AGF and ABC being picked up through flame detector relay contact FDR-3 and contact RCRB-1 of reverse current relay RCRB. Contacts AGF-1 and -2 connect the auxiliary generator shunt field winding 7 to the voltage regulator 36 and contact AGF-3 energizes the shunt coil of reverse current relay RCRB and if the differential coil is energized with the proper polarity, relay ABC will be energized which in turn closes its contact ABC-1 to connect the armature of turbine-driven auxiliary generator 3 to the battery 32 for charging. With the minimum speed relay picked up contact MSR-2 will be closed and with relay SFA dropped out, contact SFA-3 will be closed picking up time delay relay TSQ so that contact TSQ-1 is closed. Contact 23 of controller 19 is closed in the fifth position, and since the flame detector relay is energized, flame detector relay contact FDR-5 will be closed, energizing fuel valve relay FVR and time delay relay TAP. Contacts TAP-2 and FVR-1 will thus be closed, energizing operating coil TFSV of valve 17 to open fuel line 16 and with fuel temperature switch contact FTS-1 and contact 22 of controller 19 closed, fuel transfer valve FTV will be energized, connecting Bunker C fuel tank 15 to the fuel line 16. Since relay TCO is energized from the flame detector, contact TCO-2 is closed energizing turbine governor operator FAS and when the engineman closes his throttle indicated by the switch TH, turbine governor operator FFS is also energized to provide the maximum fuel rate limit. Since relay SFA is not energized, contact SFA-1 will be closed, thus connecting turbine generator shunt field winding 5 to the locomotive exciter 55 for excitation during motoring and dynamic braking. Contact 30 is closed in the fifth controller position, thus energizing contactor M to close contacts M-1 and M-2 which are shown schematically as connecting a traction motor 54 to the armature of turbine generator 2 by means of line 53. The actual connections of the traction generator 2 and the other traction generators which may be driven by the gas turbine 1 to the various traction motors do not form part of this invention and therefore, are not shown, it being understood, however, that the engineman is permitted to enter the various motoring and dynamic braking connections in the fifth position of controller 19 by virtue of the contact 30 being closed in that position. Also, it will be readily understood that fuel regulation is now handled by the turbine governor 1 and that excitation for the turbine generator 2 is handled by the exciter 55, neither of these elements forming a part of this invention and thus will not be further described.

It will now be readily apparent that this invention provides an improved system for starting a thermal prime mover, particularly a gas turbine of the type intended for utilization on a self-propelled vehicle, such as a gas turbine-electric locomotive. To summarize the operation of this system, in the first controller position a diesel generator is connected to the battery for charging. In the second controller position, the diesel generator is disconnected from the battery and connected to a traction generator with the diesel generator shunt field being connected for self separate excitation and the turbine generator shunt field being connected for battery excitation, thus operating the traction generator as a shunt-excited motor for cranking the turbine. In the second controller position, the turbine is cranked up to 10% speed. However, if 10% speed is not reached in a predetermined time delay, for example, 45 seconds, the cranking connection is broken. In the third controller position, with the turbine being cranked to 10% speed, diesel fuel is injected into the turbine and ignition is turned on. If the turbine fires, the field on the main generator is weakened and the diesel is speeded up with the turbine fuel rate being increased 90 seconds after firing. If the turbine fails to fire in 45 seconds, the fuel is shut off and the cranking connection is broken. In the third controller position, the turbine must accelerate to idle speed in 10 minutes. However, if this does not occur, fuel is cut off and cranking stopped. In the event the turbine is shunt down due to failure to fire or failure to reach idle speed in 10 minutes, it is prevented from being started again for a sufficient time to permit the unburned fuel to be drained from the combustion chambers. When the turbine reaches self-sustaining or idling speed in the third controller position, the diesel generator is disconnected from the traction generator and reconnected to the battery for charging. In the fourth position of the controller, battery charging is dropped from the diesel generator and transferred to the turbine-driven auxiliary generator. However, the diesel continues to run at no load. The turbine fuel is also transferred from diesel type to Bunker C type in the fourth position with the turbine continuing to idle on Bunker C fuel. In the fifth controller position, the diesel which has now been idling at no load is shut down and the engineman is permitted to enter the motoring and dynamic braking connections. While controller 19 is shown as having five positions, it will be readily understood that a larger or smaller number may be utilized, for example, positions 2 and 3 may be combined to simplify the starting sequence.

While I have shown and described a particular embodiment of this invention, further modifications and improvements will occur to those skilled in the art. I desire that it be understood, therefore, that this invention is not limited to the particular form shown, and I intend in the appended claims to cover all modifications which do not depart from the spirit and scope of this invention.

What I claim as new and desire to secure by Letters Patent of the United States is:

1. A system for starting a main thermal prime mover having a main generator mechanically connected thereto comprising an auxiliary thermal prime mover having an auxiliary generator mechanically connected thereto, first circuit establishing means arranged when actuated electrically to connect said auxiliary generator to said main generator for operating the same as a motor to crank said main prime mover, first time delay means connected to de-actuate said first circuit establishing means after the same has been actuated for a first predetermined time, first speed-responsive means connected to render ineffective said time delay means responsive to a first predetermined speed of said main prime mover, a source of fuel for said main prime mover, valve means arranged when actuated to connect said source of fuel to said main prime mover, said time delay means being connected to deactuate said valve means and said first circuit establishing means after said valve means has been actuated for said first predetermined time, means responsive to firing of said main prime mover connected to render ineffective said time delay means, second time delay means connected to de-actuate said valve means and said first circuit establishing means after said valve means has been actuated for a second predetermined time, and second speed-responsive means connected to render ineffective said second time delay means responsive to a second predetermined speed of said main prime mover, said second speed-responsive means being connected to de-actuate said first circuit establishing means responsive to said second predetermined main prime mover speed.

2. A system for starting a main thermal prime mover having a main generator mechanically connected thereto comprising an auxiliary thermal prime mover having an auxiliary generator mechanically connected thereto, a battery, said auxiliary generator having a field-exciting winding, said main generator having a field-exciting winding, first circuit establishing means arranged when actuated electrically to connect said auxiliary generator to said main generator for operating same as a motor to crank said main prime mover and when de-actuated to connect said auxiliary generator to said battery for charging, second circuit establishing means arranged when actuated electrically to connect said auxiliary generator field to said battery, third circuit establishing means arranged when actuated electrically to connect said main generator field to said battery, first time delay means connected to de-actuate said first, second and third circuit establishing means after the same have been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, said first time delay means being connected to de-actuate said valve means and said first, second and third circuit establishing means after said valve means has been actuated for said first predetermined time, means responsive to firing of said main prime mover connected to render ineffective said first time delay means, second time delay means connected to de-actuate said valve means and said first, second and third circuit establishing means after said valve means has been actuated for a second predetermined time, and second speed-responsive means connected to render ineffective said second time delay means responsive to a second predetermined speed of said main prime mover, said second speed-responsive means being connected to de-actuate said first, second and third circuit establishing means responsive to said second predetermined main prime mover speed.

3. A system for starting a main thermal prime mover having a main generator mechanically connected thereto comprising an auxiliary thermal prime mover having auxiliary generator mechanically connected thereto, first circuit establishing means arranged when actuated electrically to connect said auxiliary generator to said main generator for operating the same as a motor to crank said main prime mover, first time delay means connected to de-actuate said first circuit establishing means after the same has been actuated for a first predetermined time, first speed-responsive means connected to render ineffective said time delay means responsive to a first predetermined speed of said main prime mover, a source of fuel for said main prime mover, valve means arranged when actuated to connect said source of fuel to said main prime mover, said time delay means being connected to de-actuate said valve means and said first circuit establishing means after said valve means has been actuated for said first predetermined time, means responsive to firing of said main prime mover connected to render ineffective said time delay means, second time delay means connected to de-actuate said valve means and said first circuit establishing means after said valve means has been actuated for a second predetermined time, second speed-responsive means connected to render ineffective said second time delay means responsive to a second predetermined speed of said main prime mover, and third time delay means connected to prevent re-actuation of said first circuit establishing means and said fuel valve means until a third time delay after operation of said first time delay means or said second time delay means.

4. A system for starting a main thermal prime mover having a main generator mechanically connected thereto comprising an auxiliary thermal prime mover having an auxiliary generator mechanically connected thereto, said main generator having a field exciting winding, first circuit establishing means arranged when actuated electrically to connect said auxiliary generator to said main generator for operating the same as a motor to crank said main prime mover, second circuit establishing means arranged to connect said main generator field for energization, first time delay means connected to de-actuate said first and second circuit establishing means after the same have been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, third circuit establishing means connected to weaken said main generator field, said first time delay means being connected to de-actuate said valve means and said first circuit establishing means after said valve means has been actuated for said first predetermined time, means responsive to firing of said main prime mover connected to render ineffective said time delay means, second time delay means connected to de-actuate said valve means and said first and second circuit establishing means after said valve means has been actuated for a second predetermined time, and second speed-responsive means connected to render ineffective said second time delay means responsive to a second predetermined speed of said main prime mover, said second speed-responsive means being connected to de-actuate said first and second circuit-establishing means responsive to said second predetermined main prime mover speed.

5. A system for starting a main thermal prime mover having a main generator mechanically connected thereto comprising an auxiliary thermal prime mover having an auxiliary generator mechanically connected thereto, first circuit establishing means arranged when actuated electrically to connect said auxiliary generator to said main generator for operating the same as a motor to crank said main prime mover, first time delay means connnected to de-actuate said first circuit establishing means after the same has been actuated for a first predetermined time, first speed-responsive means connected to render ineffective said time delay means responsive to a first predetermined speed of said main prime mover, a source of fuel for said main prime mover, valve means arranged when actuated to connect said source of fuel to said main prime mover, second circuit establishing means arranged when actuated to accelerate said auxiliary prime mover, said first time delay means being connected to de-actuate said valve means and said first circuit establishing means after said valve means has been actuated for said first predetermined time, means responsive to firing of said main prime mover connected to render ineffective said first time delay means, second time delay means connected to de-actuate said valve means and said first circuit establishing means after said valve means has been actuated for a second predetermined time, and second speed-responsive means connected to render ineffective said second time delay means responsive to a second predetermined speed of said main prime mover, said second speed-responsive means being connected to de-actuate asid first circuit establishing means responsive to said second predetermined speed of said main prime mover.

6. A system for starting a main thermal prime mover having a main generator mechanically connected thereto comprising an auxiliary thermal prime mover having an auxiliary generator mechanically connected thereto, first circuit establishing means arranged when actuated electrically to connect said auxiliary generator to said main generator for operating the same as a motor to crank said main prime mover, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, means responsive to firing of said main prime mover to increase the fuel rate thereto, said first time delay means being connected to de-actuate said valve means and said first circuit establishing means after said valve means has been actuated for a period of time equal to said first predetermined time delay, means responsive to firing of said main prime mover connected to render ineffective said first time delay means, second time delay means connected to de-actuate said valve means and said first circuit establishing means after said valve means has been actuated for a second predetermined time, and second speed-responsive means connected to render ineffective said second time delay means responsive to a second predetermined speed of said main prime mover, said second speed-responsive means being connected to de-actuate said first circuit establishing means responsive to said second predetermined main prime mover speed.

7. In a self-propelled vehicle, a system for starting a main gas turbine prime mover having a main generator and a first auxiliary generator mechanically connected thereto comprising an auxiliary diesel prime mover having a second auxiliary generator mechanically connected thereto, a battery, first circuit establishing means arranged when actuated electrically to connect said second auxiliary generator to said main generator for operating the same as a motor to crank said main prime mover and when de-actuated to connect said second auxiliary generator to said battery for charging, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, said first time delay means being connected to de-actuate said valve means and said first circuit establishing means after said valve means has been actuated for a period of time equal to said first predetermined time delay, means responsive to firing of said main prime mover connected to render ineffective said first time delay means, second time delay means connected to de-actuate said valve means and said first circuit establishing means after said valve means has been actuated for a second predetermined time, second speed-responsive means connected to render ineffective said second time delay means responsive to a second predetermined speed of said main prime mover, said second speed-responsive means being connected to de-actuate said first circuit establishing means responsive to said second predetermined main prime mover speed, second circuit establishing means arranged when actuated electrically to connect said auxiliary generator to said battery for charging, and means for shutting down said auxiliary prime mover.

8. In a self-propelled vehicle, a system for starting a main gas turbine prime mover having a main generator mechanically connected thereto, comprising an auxiliary diesel prime mover having an auxiliary generator mechanically connected thereto, a battery, said auxiliary generator having a shunt field exciting winding, said main generator having a shunt field exciting winding, first circuit establishing means arranged when actuated electrically to connect said auxiliary generator to said main generator for operating the same as a motor to crank said main prime mover and when deactuated to connect said auxiliary generator to said battery for charging, second circuit establishing means arranged when actuated electrically to connect said auxiliary generator field to said battery, third circuit establishing means arranged when actuated electrically to connect said main generator field to said battery, first time delay means connected to de-actuate said first, second and third circuit establishing means after the same have been actuated for a first predetermined time, first speed-responsive means connected to render ineffective said first time delay means responsive to a predetermined speed of said main prime mover, a source of fuel for said main prime mover, valve means arranged when actuated to connect said source of fuel to said main prime mover, fourth circuit establishing means arranged when actuated to weaken said main generator field and to accelerate said auxiliary prime mover, means responsive to firing of said main prime mover to increase the fuel rate thereto, said first time delay means being connected to de-actuate said valve means and said first, second and third circuit establishing means after said valve means has been actuated for a period of time equal to said first predetermined time, means responsive to firing of said main prime mover connected to render ineffective said first time delay means, second time delay means connected to de-actuate said valve means and said first, second and third circuit establishing means after said valve means has been actuated for a second predetermined time, second speed-responsive means connected to render ineffective said second time delay means responsive to a second predetermined speed of said main prime mover, and third time delay means connected to prevent reactuation of said valve means until a third predetermined time after operation of said first or second time delay means, said second speed-responsive means being connected to deactuate said first, second and third circuit establishing means responsive to said second predetermined main prime mover speed.

9. A system for starting a main thermal prime mover having a main generator mechanically connected thereto, comprising an auxiliary thermal prime mover having an auxiliary generator mechanically connected thereto, a first circuit establishing device arranged when energized electrically to connect said auxiliary generator to said main generator for operating the same as a motor to crank said main prime mover, first time delay means connected to de-actuate said first circuit establishing device after the same has been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said first time delay means being connected to de-actuate said valve device and said first circuit establishing device after said valve device has been actuated for a period of time equal to said first predetermined time, means responsive to firing of said main prime mover connected to render ineffective said first time delay means, second time delay means connected to de-actuate said valve device and said first circuit establishing device after said valve device has been actuated for a second predetermined time, second speed-responsive means connected to render ineffective said second time delay means responsive to the second predetremined speed of said main prime mover, said second speed-responsive means being connected to de-actuate said first circuit establishing device responsive to said second predetermined main prime mover speed, and supervisory control means connected to sequentially energize said devices.

10. A system for starting a main thermal prime mover having a main generator mechanically connected thereto comprising an auxiliary thermal prime mover having an auxiliary generator mechanically connected thereto, a first circuit establishing device arranged when energized electrically to connect said auxiliary generator to said main generator for operating the same as a motor to crank said main prime mover, first time delay means connected to de-actuate said first circuit establishing device after the same has been energized for a first predetermined time, first speed-responsive means connected to render ineffective said time delay means responsive to a first predetermined speed of said main prime mover, a source of fuel for said main prime mover, a valve device arranged when energized to connect said source of fuel to said main prime mover, said time delay means being connected to de-actuate said valve device and said first circuit establishing device after said valve device has been actuated for a period of time equal to said first predetermined time, means responsive to firing of said main prime mover connected to render ineffective said time delay means, second time delay means connected to de-actuate said valve device and said first circuit establishing device after said valve device has been actuated for a second predetermined time, second speed-responsive means connected to render ineffective said second time delay means responsive to a second predetermined speed of said main prime mover, said second speed-responsive means being connected to de-energize said first circuit establishing device responsive to said second predetermined main prime mover speed, and supervisory control means connected to sequentially energize said devices, said supervisory control means connecting said first circuit establishing device for energization in a first position and both of said devices for energization in a second position.

11. A system for starting a main thermal prime mover having a main generator mechanically connected thereto comprising an auxiliary thermal prime mover having an auxiliary generator mechanically connected thereto, a battery, a first circuit establishing device arranged when energized electrically to connect said auxiliary generator to said main generator for operating same as a motor ot crank said main prime mover and when de-energized to connect said auxiliary generator to said battery for charging, first time delay means connected to de-energize said first circuit establishing device after the same has been energized for a first predetermined time, first speed-responsive means connected to render ineffective said time delay means responsive to a first predetermined speed of said main prime mover, a source of fuel for said main prime mover, a valve device arranged when energized to connect said source of fuel to said main prime mover, said time delay means being connected to de-energize said valve device and said first circuit establishing device after said valve device has been energized for a period of time equal to said first predetermined time, means responsive ot firing of said main prime mover connected to render ineffective said time delay means, second time delay means connected to de-actuate said valve means and said first circuit establishing means after said valve device has been energized for a second predetermined time, second speed-responsive means connected to render ineffective said second time delay means responsive to a second predetermined speed of said main prime mover, said second speed-responsive means being connected to de-energize said first circuit establishing device responsive to said second predetermined main prime mover speed, and supervisory control means connected to sequentially energize said devices, said first circuit establishing device being de-energized in a first position of said supervisory control means, said first circuit establishing means being energized in a second position of said supervisory control means, and both of said devices being energized in a third position of said supervisory control means.

12. A system for starting a main thermal prime mover having a main generator mechanically connected thereto comprising an auxiliary thermal prime mover having an auxiliary generator mechanically connected thereto, a battery, said auxiliary generator having a shunt field exciting winding, said main generator having a shunt field exciting winding, a first circuit establishing device arranged when energized electrically to connect said auxiliary generator to said main generator for operating the same as a motor to crank said main prime mover and when de-energized to connect said auxiliary generator to said battery for charging, a second circuit establishing device arranged when energized to connect said auxiliary generator field winding to said battery, a third circuit establishing device arranged when energized to connect said main generator field winding to said battery, first time delay means connected to de-actuate said first, second and third circuit establishing devices after the same have been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said time delay means being connected to de-actuate said valve device and said first, second and third circuit establishing devices after said valve device has been energized for a period of time equal to said first predetermined time, means responsive to firing of said main prime mover connected to render ineffective said first time delay means, second time delay means connected to de-energize said valve device and said first, second and third circuit establishing devices after said valve device has been actuated for a second predetermined time, second speed-responsive means connected to render ineffective said second time delay means responsive to a second predetermined speed of said main prime mover, said second speed-responsive means being connected to de-actuate said first, second and third circuit establishing devices responsive to said second predetermined main prime mover speed, supervisory control means connected to sequentially energize said devices, said first circuit establishing device being de-energized in a first position of said supervisory control means, said first, second and third circuit establishing devices being connected for energization in a second position of said supervisory control means, and all of said devices being connected for energization in a third position of said supervisory control means.

13. A system for starting a main thermal prime mover having a main generator and a first auxiliary generator mechanically connected thereto comprising an auxiliary thermal prime mover having a second auxiliary generator mechanically connected thereto, a battery, a first circuit establishing device arranged when energized electrically to connect said second auxiliary generator to said main generator for operating the same as a motor to crank said main prime mover and when deenergized to connect said second auxiliary generator to said battery for charging, first time delay means connected to de-energize said first circuit establishing device after the same has been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said first time delay means being connected to de-actuate said valve device and said first circuit establishing device after said valve device has been energized for a period of time equal to said first predetermined time, means responsive to firing of said main prime mover connected to render ineffective said first time delay means, second time delay means connected to de-energize said valve device and said first circuit establishing device after said valve device has been energized for a second predetermined time, second speed-responsive means connected to render ineffective said second time delay means responsive to a second predetermined speed of said main prime mover, said second speed-responsive means being connected to de-energize said first circuit establishing device responsive to said second predetermined speed of said main prime mover, a second circuit establishing device arranged when energized to connect said first auxiliary generator to said battery for charging, an operating device arranged when energized to operate said auxiliary prime mover and when de-energized to shut down said auxiliary prime mover, supervisory control means connected to sequentially energize said devices, said operating device being energized in a first position of said supervisory control means, said operating device and said first circuit establishing device being energized in a second position of said supervisory control means, all of said devices being energized in a third position of said supervisory control means, and said valve device and said second circuit establishing device being connected for energization in the fourth position of said supervisory control means.

14. A system for starting a main thermal prime mover having a main generator mechanically connected thereto comprising an auxiliary thermal prime mover having an auxiliary generator mechanically connected thereto, a first circuit establishing device arranged when energized electrically to connect said auxiliary generator to said main generator for operating same as a motor to crank said main prime mover, first time delay means connected to de-energize said first circuit establishing device after the same has been energized for a first predetermined time, first speed-responsive means connected to render ineffective said first time delay means responsive to a first predetermined speed of said main prime mover, a source of fuel for said main prime mover, a first valve device arranged when energized to connect said source of fuel to said main prime mover, a second source of fuel for said main prime mover, a second valve device arranged when energized to connect said second source of fuel to said main prime mover, said time delay means being connected to de-energize said first valve device and said first circuit establishing device after said first valve device has been energized for a period of time equal to said first predetermined time, means responsive to firing of said main prime mover connected to render ineffective said first time delay means, second time delay means connected to de-actuate said first valve device and said first circuit establishing device after said first valve device has been energized for a second predetermined time, second speed-responsive means connected to render ineffective said second time delay means responsive to a second predetermined speed of said main prime mover, said second speed-responsive means being connected to de-actuate said first circuit establishing device responsive to said second predetermined main prime mover speed, and supervisory control means connected to sequentially energize said devices, said first circuit establishing device being connected for energization in a first position of said supervisory control means, said first circuit establishing device and said first valve device being connected for energization in a second position of said supervisory control means, and said second valve device being connected for energization in a third position of said supervisory control means.

15. A system for starting a main thermal prime mover having a main generator mechancially connected thereto comprising an auxiliary thermal prime mover having an auxiliary generator mechanically connected thereto, first circuit establishing means arranged when actuated electrically to connect said auxiliary generator to said main generator for operating the same as a motor to crank said main prime mover, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, said time delay means being connected to de-actuate said valve means and said first circuit establishing means after said valve means has been actuated for a period of time equal to said first predetermined time, means responsive to firing of said main prime mover connected to render ineffective said first time delay means, second time delay means connected to de-actuate said valve means and said first circuit establishing means after said valve means has been actuated for a second predetermined time, and means responsive to reverse current flowing in said auxiliary generator to main generator connection arranged to render ineffective said second time delay means responsive to a second predetermined speed of said main prime mover, said last-named means being connected to de-actuate said first circuit establishing means responsive to said second predetermined main prime mover speed.

16. A system for starting a main thermal prime mover having a main generator mechanically connected thereto comprising an auxiliary thermal prime mover having an auxiliary generator mechanically connected thereto, a battery, a shunt field exciting winding for said main generator, first circuit establishing means arranged when actuated electrically to connect said auxiliary generator to said main generator for operating same as a motor to crank said main prime mover and when de-actuated to connect said auxiliary generator to said battery for charging, a second circuit establishing means arranged when actuated electrically to connect said main generator field winding to said battery, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, a device for detecting combustion in said main prime mover, third circuit establishing means connected to weaken said main generator shunt field winding responsive to said combustion-detecting device, said first time delay means being connected to de-actuate said valve means and said first circuit establishing means after said valve means has been actuated for a period of time equal to said first predetermined time, means responsive to said combustion-detecting device connected to render ineffective said first time delay means, second time delay means connected to de-actuate said valve means and said first circuit establishing device after said valve means has been actuated for a second predetermined time, and second speed-responsive means connected to render ineffective said second time delay means responsive to a second predetermined speed of said main prime mover, said second speed-responsive means being connected to de-actuate said first circuit establishing means responsive to said second predetermined main prime mover speed.

17. A system for starting a main thermal prime mover having a main generator mechanically connected thereto comprising an auxiliary thermal prime mover having an auxiliary generator mechanically connected thereto, a first circuit establishing means arranged when actuated electrically to connect said auxiliary generator to said main generator for operating the same as a motor to crank said main prime mover, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, valve means arranged when actuated to connect said source of fuel to said main prime mover, means for detecting combustion in said main prime mover, means responsive to said combustion-detecting means for accelerating said auxiliary prime mover, said first time delay means being connected to de-actuate said valve means and said first circuit establishing means after said valve means has been actuated for a period of time equal to said first predetermined time, means responsive to said combustion-detecting means connected to render ineffective said first time delay means, second time delay means connected to de-actuate said valve means and said first circuit establishing means after said valve means has been actuated for a second predetermined time, second speed-responsive means connected to render ineffective said second time delay means responsive to a second predetermined speed of said main prime mover, said second speed-responsive means being connected to de-actuate said first circuit establishing means responsive to a second predetermined main prime mover speed.

18. A system for starting a main thermal prime mover having a main generator mechanically connected thereto comprising an auxiliary thermal prime mover having an auxiliary generator mechanically connected thereto, a first circuit establishing device arranged when energized electrically to connect said auxiliary generator to said main generator for operating the same as a motor to crank said main prime mover, first time delay means connected to de-energize said first circuit establishing device after the same has been energized for a first predetermined time, first speed-responsive means connected to render ineffective said first time delay means responsive to first predetermined speed of said main prime mover, a source of fuel for said main prime mover, a valve device arranged when energized to connect said source of fuel to said main prime mover, said time delay means being connected to de-energize said valve means and said first circuit establishing means after said valve means has been energized for a period of time equal to said first predetermined time, means responsive to firing of said main prime mover connected to render ineffective said time delay means, second time delay means connected to de-energize said valve means and said first circuit establishing means after said valve means has been energized for a second predetermined time, second speed-responsive means connected to render ineffective said second time delay means responsive to a second predetermined speed of said main prime mover, said second speed-responsive means being connected to de-energize said first circuit-establishing device responsive to said second predetermined main prime mover speed, and a circuit controller having a plurality of contacts, one of said contacts connecting said first circuit establishing device for energization in a first predetermined number of steps of said controller, a second of said contacts connecting said valve device for energization in a second predetermined number of steps of said controller.

19. A system for starting a main thermal prime mover having a main generator mechanically connected thereto comprising an auxiliary thermal prime mover having an auxiliary generator mechanically connected thereto, a battery, a first circuit establishing device arranged when energized electrically to connect said auxiliary generator to said main generator for operating the same as a motor to crank said main prime mover and when de-energized to connect said auxiliary generator to said battery for charging, first time delay means connected to de-energize said first circuit establishing device after the same has been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said first time delay means being connected to de-energize said valve device and said first circuit establishing device after said valve device has been actuated for a period of time equal to said first predetermined period of time, means responsive to firing of said main prime mover connected to render ineffective said first time delay means, second time delay means connected to de-energize said valve device and said first circuit establishing device after said valve device has been energized for a second predetermined time, second speed-responsive means connected to render ineffective said second time delay means responsive to said second predetermined speed of said main prime mover, said second speed-responsive means being connected to de-energize said first circuit establishing device responsive to said second predetermined main prime mover speed, and a circuit controller having a plurality of contacts, none of said devices being connected for energization in a first position of said controller, one of said contacts connecting said first circuit establishing device for energization in a first predetermined number of steps of said controller, another of said contacts connecting said valve device for energization in a second predetermined number of steps of said controller.

20. In a self-propelled vehicle, a system for starting a main gas turbine prime mover having a main generator mechanically connected thereto comprising an auxiliary diesel prime mover having an auxiliary generator mechanically connected thereto, a battery, said auxiliary generator having a shunt field exciting winding, said main generator having a shunt field exciting winding, a first circuit establishing device arranged when energized electrically to connect said auxiliary generator to said main generator for operating the same as a motor to crank said main prime mover and when de-energized to connect said auxiliary generator to said battery for charging, a second circuit establishing device arranged when energized to connect said auxiliary generator field to said battery, a third circuit establishing device arranged when energized to connect said main generator field to said battery, first time delay means connected to de-energize said first, second and third circuit establishing devices after the same have been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said first time delay means being connected to de-energize said valve device and said first, second and third circuit establishing devices after said valve device has been energized for a period of time equal to said first period of time, means responsive to firing of said main prime mover connected to render ineffective said first time delay means, second time delay means connected to de-energize said valve device and said first, second and third circuit establishing devices after said valve device has been energized for a second predetermined time, second speed-responsive means connected to render ineffective said second time delay means responsive to a second predetermined speed of said main prime mover, said second speed-responsive means being connected to de-energize said first, second and third circuit establishing means responsive to said second predetermined speed of said main prime mover, and a circuit controller having a plurality of contacts, none of said devices being connected for energization a first step of said controller, said first, second and third circuit establishing devices being connected for energization in a first predetermined number of steps of said controller past said first step, said valve device being connected for energization in a second predetermined number of steps of said controller.

21. In a self-propelled vehicle, a system for starting a main gas turbine prime mover having a main generator and a first auxiliary generator mechanically connected thereto comprising an auxiliary diesel prime mover having a second auxiliary generator mechanically connected thereto, a first circuit establishing device arranged when energized electrically to connect said second auxiliary generator to said main generator for operating the same as a motor to crank said main prime mover and when de-energized to connect said second auxiliary generator to said battery for charging, first time delay means connected to de-energize said first circuit establishing device after the same has been energized for a first predetermined time, first speed-responsive means connected to render ineffective said first time delay means responsive to a first predetermined speed of said main prime mover, a source of fuel for said main prime mover, a valve device arranged when energized to connect said source of fuel to said main prime mover, said first time delay means being connected to de-energize said valve device and said first circuit establishing device after said valve device has been energized for a period of time equal to said first predetermined time, means responsive to firing of said main prime mover connected to render ineffective said first time delay means, second time delay means connected to de-energize said valve device and said first circuit establishing device after said valve device has been actuated for a second predetermined time, second speed-responsive means connected to render ineffective said second time delay means responsive to a second predetermined speed of said main prime mover, said second speed-responsive means being connected to de-energize said first circuit establishing device responsible to said second predetermined main prime mover speed, a second circuit establishing device arranged when energized electrically to connect said first auxiliary generator to said battery for charging, an operating device arranged when energized to run said auxiliary prime mover and when de-energized to shut down said auxiliary prime mover, and a circuit controller having a plurality of contacts, a first of said contacts connecting said operating device for energization in a first predetermined number of steps of said controller, a second of said contacts connecting said first circuit establishing device for energization in a second predetermined number of steps of said controller, a third of said contacts connecting said valve device for energization in a third predetermined number of steps of said controller, a fourth of said contacts connecting said second circuit establishing device for energization in a fourth predetermined number of steps of said controller.

22. A system for starting a main thermal prime mover having a main generator mechanically connected thereto comprising an auxiliary thermal prime mover having an auxiliary generator mechanically connected thereto, a first circuit establishing device arranged when energized electrically to connect said auxiliary generator to said main generator for operating the same as a motor to crank said main prime mover, first time delay means connected to de-energize said first circuit establishing means after the same has been energized for a first predetermined time, first speed-responsive means connected to render ineffective said first time delay means responsive to a first predetermined speed of said main prime mover, a source of first type of fuel for said main prime mover, a first valve device arranged when energized to connect said source of said first type of fuel to said main prime mover, a source of second type of fuel for said main prime mover, a second valve device arranged when energized to connect said source of said second type of fuel to said main prime mover, said first time delay means being connected to de-energize said first valve device and said first circuit establishing device after said first valve device has been energized for a period of time equal to said first predetermined time, means responsive to firing of said main prime mover connected to render ineffective said first time delay means, second time delay means connected to deenergize said first valve device and said first circuit establishing device after said first valve device has been energized for a second predetermined time, second speed-responsive means connected to render ineffective said second time delay means responsive to a second predetermined speed of said main prime mover, said second speed-responsive means being connected to de-energize said first circuit establishing device responsive to said second predetermined main prime mover speed, and a circuit controller having a plurality of contacts, one of said contacts connecting said first circuit establishing device for energization in a first predetermined number of steps of said controller, a second of said contacts connecting said first valve device for energization in a second predetermined number of steps of said controller, and a third of said contacts connecting said second valve device for energization in a third predetermined number of steps of said controller.

23. A system for starting a main thermal prime mover having a main generator mechanically connected thereto comprising an auxiliary thermal prime mover having an auxiliary generator mechanically connected thereto, a first circuit establishing means arranged when actuated electrically to connect said auxiliary generator to said main generator for operating same as a motor to crank said main prime mover, first time delay means connected to de-actuate said first circuit establishing means after the same has been actuated for a first predetermined time, first speed-responsive means connected to render ineffective said first time delay means responsive to a first predetermined speed of said main prime mover, a source of fuel for said main prime mover, and valve means arranged when actuated to connect said source of fuel to said main prime mover.

24. A system for starting a main thermal prime mover having a main generator mechanically connected thereto comprising an auxiliary thermal prime mover having an auxiliary generator mechanically connected thereto, a first circuit establishing means arranged when actuated electrically to connect said auxiliary generator to said main generator for operating the same as a motor to crank said main prime mover, a source of fuel for said main prime mover, valve means arranged when actuated to connect said source of fuel to said main prime mover, time delay means connected to de-actuate said valve means and said first circuit establishing means after said valve means has been actuated for a first predetermined time, and means responsive to firing of said main prime mover connected to render ineffective said time delay means.

25. A system for starting a main thermal prime mover having a main generator mechanically connected thereto comprising an auxiliary thermal prime mover having an auxiliary generator mechanically connected thereto, a first circuit establishing means arranged when actuated electrically to connect said auxiliary generator to said main generator for operating the same as a motor to crank said main prime mover, a source of fuel for said main prime mover, valve means arranged when actuated to connect said source of fuel to said main prime mover, time delay means connected to de-actuate said valve means and said first circuit establishing means after said valve means has been actuated for a predetermined time, and speed-responsive means connected to render ineffective said time delay means responsive to a predetermined speed of said main prime mover, said speed-responsive means being connected to de-actuate said first circuit establishing means responsive to said predetermined main prime mover speed.

26. A system for starting a main thermal prime mover having a main generator mechanically connected thereto comprising an auxiliary thermal prime mover having an auxiliary generator mechanically connected thereto, first circuit establishing means arranged when actuated electrically to connect said auxiliary generator to said main generator for operating the same as a motor to crank said main prime mover, a source of fuel for said main prime mover, valve means arranged when actuated to connect said source of fuel to said main prime mover, time delay means connected to de-actuate said valve means and said first circuit establishing means after said valve means has been actuated for a predetermined time, and means responsive to reverse current flowing in said auxiliary generator to main generator connection arranged to render ineffective said time delay means responsive to a predetermined speed of said main prime mover, said last-named means being connected to de-actuate said first circuit establishing means responsive to said predetermined main prime mover speed.

CARL A. BRANCKE.
THURLOW J. WARRICK.

References Cited in the file of this patent
UNITED STATES PATENTS

| Number | Name | Date |
| --- | --- | --- |
| 1,139,521 | Heany | May 18, 1915 |
| 1,409,736 | Lea | Mar. 14, 1922 |
| 2,070,615 | Plante | Feb. 16, 1937 |
| 2,298,309 | Ray | Oct. 13, 1942 |
| 2,336,052 | Anderson et al. | Dec. 7, 1943 |
| 2,405,676 | Strub | Aug. 13, 1946 |
| 2,503,289 | Nettel | Apr. 11, 1950 |
| 2,624,849 | Bennett-Powell | Jan. 6, 1953 |